(12) United States Patent
Jin

(10) Patent No.: US 8,442,039 B2
(45) Date of Patent: May 14, 2013

(54) METHOD, USER EQUIPMENT AND SERVER FOR MULTIMEDIA SESSION TRANSFER

(75) Inventor: Hui Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 12/911,199

(22) Filed: Oct. 25, 2010

(65) Prior Publication Data

US 2011/0051722 A1 Mar. 3, 2011

Related U.S. Application Data

(63) Continuation of application No. PCT/CN2009/074755, filed on Nov. 2, 2009.

(30) Foreign Application Priority Data

Nov. 7, 2008 (CN) .......................... 2008 1 0217411

(51) Int. Cl.
*H04L 12/66* (2006.01)
(52) U.S. Cl.
USPC .......................................................... 370/355
(58) Field of Classification Search ............... 370/352–6
See application file for complete search history.

(56) References Cited

U.S. PATENT DOCUMENTS

| | | |
|---|---|---|
| 2003/0055977 A1 | 3/2003 | Miller |
| 2003/0088765 A1 | 5/2003 | Eschbach et al. |
| 2006/0189340 A1* | 8/2006 | Sung et al. ................... 455/518 |
| 2009/0323656 A1* | 12/2009 | Mahdi ........................... 370/338 |
| 2011/0211525 A1 | 9/2011 | Mahdi |
| 2012/0015623 A1* | 1/2012 | Bakker et al. .............. 455/404.2 |

FOREIGN PATENT DOCUMENTS

| | | |
|---|---|---|
| CN | 1255032 | 5/2000 |
| CN | 101176327 | 5/2008 |
| CN | 101217788 | 7/2008 |

(Continued)

OTHER PUBLICATIONS

3GPP, "TS 23.237, V8.1.0 (Sep. 2008) IP Multimedia Subsystem IMS Service Continuity Stage 2 Rel. 8", Sep. 2008, provided by Applicant's IDS.*

(Continued)

*Primary Examiner* — Mark Rinehart
*Assistant Examiner* — Peter Cheng
(74) *Attorney, Agent, or Firm* — Staas & Halsey LLP

(57) ABSTRACT

The present invention discloses a method, User Equipment (UE), and server for multimedia session transfer, and relates to a mobile communication technology, and in particular, to a technology for transferring multimedia sessions from a Circuit Switched (CS) network to a Packet Switched (PS) network. The method includes: receiving a session transfer request sent by a UE, where the session transfer request carries a static Session Transfer Identifier (STI); executing a procedure for transferring the active CS session according to the CS session transfer request, and judging whether the UE has a held CS session; and if so, sending the dynamic STI corresponding to the held CS session to the UE so that the UE can send a CS session transfer request again according to the dynamic STI, and receiving the request for transferring the held CS session and executing a procedure for transferring the held CS session. Further, a UE and a server are provided. With the present invention, two multimedia sessions in a CS network of the UE incapable of IMS Centralized Service (ICS) can be transferred to the PS network.

7 Claims, 9 Drawing Sheets

FOREIGN PATENT DOCUMENTS

| CN | 101262414 | 9/2008 |
|---|---|---|
| CN | 101742589 | 6/2011 |
| KR | 2008-0018756 | 2/2008 |
| WO | 2008/058877 | 5/2008 |
| WO | 2008/084136 | 7/2008 |

OTHER PUBLICATIONS

Change Request 23.237 CR 0084 52-087701 Current Version 8.1.0, Huawei: "CS to PS Access Transfer for Active/Held sessions—not using ICS capabilities", 3GPP Draft; S2-087701_CR0084 CS to PS Access Transfer for Active & Held Sessions—Not using ICS Capabilities, $3^{rd}$ Generation Partnership Project, Mobile Competence Centre, 650, Route Des Lucioles, France, Nov. 17, 2008, 3 pages.

3GPP TS 23.237 V8.1.0 (Sep. 2008), "$3^{rd}$ Generation Partnership Project; Technical Specification Group Services and Architecture, IP Multimedia Subsystem (IMS) Service Continuity, Stage 2 (Release 8)", France, No. V8.1.0, Sep. 1, 2008, pp. 1-41.

Supplemental European Search Report issued Aug. 18, 2011 in corresponding European Patent Application No. 09824396.7-1244.

Written Opinion of the International Searching Authority issued Feb. 11, 2010 in corresponding PCT Application No. PCT/CN2009/074755.

Korean Office Action issued Mar. 29, 2012 in corresponding Korean Patent Application No. 10-2011-7006428.

3GPP TS 23.237 V8.1.0, "$3^{rd}$ Generation Partnership Project; Technical Specification Group Services and Architecture; IP Multimedia Subsystem (IMS) Service Continuity; Stage 2 (Release 8)", Sep. 2008, pp. 1-41.

3GPP TSG-SA WG2 Meeting #57, "Corrections on STI assignment conditions", Change Request, Aug. 2008, pp. 1-4.

3GPP TR 23.893 V.8.0.0, "$3^{rd}$ Generation Partnership Project; Technical Specification Group Services and Architecture; Feasibility Study on Multimedia Session Continuity; Stage 2 (Release 8)", Jun. 2008, 74 pages.

3GPP TSG-SA WG2 Meeting #67, "Change Request", Oct. 2008, 35 pages.

Japanese Office Action issued Sep. 11, 2012 in corresponding Japanese Patent Application No. 2011-528175.

International Search Report, mailed Feb. 11, 2010, in corresponding International Application No. PCT/CN2009/074755 (4 pp.).

English Translation of the PCT Written Opinion of ISA issued Feb. 11, 2010 in corresponding International Patent Application PCT/CN2009/074755 (7 pages).

"$3^{rd}$ Generation Partnership Project; Technical Specification Group Core Network and Terminals; Voice Call Continuity between the Circuit-Switched (CS) domain and the IP Multimedia Core Network (CN) (IMS) subsystem; Stage 3 (Release 7)", 3GPP TS 24.206, V7.0.1, Jan. 2007, 112 pages.

US Office Action issued Feb. 11, 2013 in related continuation child U.S. Appl. No. 13/713,659 (19 pages).

Japanese Notice of Allowance issued Feb. 5, 2013 in corresponding Japanese Patent Application No. 2011-528175 (3 pages) (1 page English translation).

3GPP TSG-SA WG2 Meeting #67, Qingdao, China, Oct. 13-17, 2008 "Change Request" ("Starent Networks, Correction to the specification with correct definition of media flow") (34 pages).

* cited by examiner

METHOD, USER EQUIPMENT AND SERVER FOR MULTIMEDIA SESSION TRANSFER

CROSS-REFERENCE TO RELATED APPLICATIONS

This application is a continuation of International Application No. PCT/CN2009/074755, filed on Nov. 2, 2009, which claims priority to Chinese Patent Application No. 200810217411.0, filed on Nov. 7, 2008, both of which are hereby incorporated by reference in their entireties.

FIELD OF THE INVENTION

The present invention relates to a mobile communication technology, and in particular, to a technology for transferring multimedia sessions from a Circuit Switched (CS) network to a Packet Switched (PS) network.

BACKGROUND OF THE INVENTION

Currently, mobile communication networks are primarily CS networks, for example, Global System for Mobile communications (GSM) and Code Division Multiple Access (CDMA) networks. Operators have set up perfect and diverse service platforms based on CS networks. On such platforms, a Mobile Switching Center (MSC) is responsible for routing calls and executing service logics.

An IP Multimedia Subsystem (IMS) is a service network based on Internet Protocol (IP) switching. The IMS allows a User Equipment (UE) to access an IMS network through various PS access networks (such as an IP Connectivity Access Network (IP-CAN)) and carry out IMS multimedia services. That is, the IMS is a service platform built on the IP-CAN, and basically corresponds to the MSC of the CS network. Compared with the CS network, the IP-CAN provides higher bandwidth and supports richer services. The core of the IMS is the Call Session Control Function (CSCF) and various Application Servers (ASs). A Serving-CSCF (S-CSCF) is responsible for routing a call request to an appropriate AS when conditions are fulfilled, and the AS executes service logics.

Because the IMS is a megatrend, it is appropriate that the functions of the CS network service platform are transferred to the IMS network to unify the service platform and reduce the costs of developing and operating new services. The unification of service platforms is also known as an IMS Centralized Service (ICS).

Service Continuity (SC) deals with session continuity that appears when a user moves from one access network to another. That is, the access network can be changed without interrupting the session when the user moves.

An SC UE performs session transfer between access networks according to the following procedure: At the new access network, the UE sends a transfer request to a Service Centralization and Continuity Application Server (SCC AS), with a view to setting up a new access leg between the UE and the SCC AS in the new access network. After receiving the transfer request, the SCC AS associates a remote leg corresponding to the access leg of the old access network with the access leg of the new access network, and updates the remote leg and releases the access leg of the old access network at the same time. The remote leg refers to a call control path between the SCC AS and the peer UE. The access leg and the remote leg are defined in 3GPP TS23.237.

A Session Transfer Identifier (STI) is an identifier indicating initiation of session transfer. Generally, when a new access leg is set up between the UE and the SCC AS, the SCC AS allocates the STI dynamically. Each dynamic STI corresponds to a specific access leg uniquely. When the user wants to perform handover, if a dynamic STI exists in the UE, the UE sends a transfer request by using the dynamic STI as a called number. The SCC AS determines the old access leg which needs to be replaced by the new access leg according to the STI.

A static STI and a static Session Transfer Number (STN) are stored in each SC UE. When the UE has no dynamic STI, the static STI or STN is used as a called number to initiate transfer. The SC UE may be an ICS UE (UE capable of ICS) or non ICS UE (UE incapable of ICS). If the SC UE is a non ICS UE, when the UE sends a session request from the CS network, the dynamic STI allocated by the SCC AS to the new access leg cannot be transmitted to the UE. Therefore, only the static STI can be used when the UE initiates transfer from the CS network to the PS network. The STN can be used only if the SC UE is a non ICS UE and the transfer is initiated from the PS network to the CS network.

The STN, the static STI, and the dynamic STI are different in structure. The SCC AS can easily identify whether the user uses an STN, or a static STI, or a dynamic STI.

In the process of implementing the present invention, the inventor finds at least the following problems in the prior art:

When a non ICS UE moves from a CS network to a PS network, because no dynamic STI exists, only the static STI is available, and only one static STI is stored in the UE. When the non ICS UE has two multimedia sessions in the CS network, the non ICS UE can transfer only the CS session which is currently active, but is incapable of transferring the held session, for no more STI exists.

SUMMARY OF THE INVENTION

Embodiments of the present invention provide a method, UE, and server for multimedia session transfer so that two multimedia sessions of a non ICS UE can be transferred from a CS network to a PS network.

To fulfill the foregoing objectives, a method for multimedia session transfer in an embodiment of the present invention includes:
  receiving a session transfer request sent by a UE, wherein the session transfer request carries a static STI;
  determining that the UE requests to transfer an active CS session according to the static STI, executing a procedure for transferring the active CS session according to the session transfer request, and judging whether the UE has a held CS session;
  if the UE has a held CS session, sending a dynamic STI allocated to the held CS session to the UE; and
  receiving another session transfer request sent by the UE, wherein the other session transfer request carries the dynamic STI; and executing a procedure for transferring the held CS session according to the other session transfer request.

Another method for multimedia session transfer in an embodiment of the present invention includes:
  receiving a session transfer request sent by a UE, wherein the session transfer request carries a static STI;
  determining that the UE requests to transfer an active CS session according to the static STI, executing a procedure for transferring the active CS session according to the session transfer request, and judging whether the UE has a held CS session; and if the UE has a held CS session, sending a call request to the UE to transfer the held CS session, and executing a procedure for transferring the held CS session.

Another method for multimedia session transfer in an embodiment of the present invention includes:

receiving a session transfer request sent by a UE, wherein the session transfer request carries a static STI;

determining that the UE requests to transfer an active Circuit Switched (CS) session according to the static STI, and executing a procedure for transferring the active CS session according to the session transfer request; and receiving a session transfer request carrying the static STI and/or a Session Transfer Number (STN) from the UE; determining that the UE requests to transfer a held CS session according to the static STI and/or the STN, and executing a procedure for transferring the held CS session according to the request for transferring the held CS session.

A server for multimedia session transfer in an embodiment of the present invention includes:

a first module, adapted to: receive a session transfer request sent by a User Equipment (UE), wherein the session transfer request carries a static Session Transfer Identifier (STI); determine that the UE requests to transfer an active Circuit Switched (CS) session according to the static STI; execute a procedure for transferring the active CS session according to the session transfer request and judge whether the UE has a held CS session; and if so, send a trigger signal to a second module; and the second module, adapted to: send a dynamic STI allocated to the held CS session to the UE after receiving the trigger signal sent by the first module; receive another session transfer request sent by the UE, wherein the session transfer request carries the dynamic STI; and execute a procedure for transferring the held CS session according to the other session transfer request.

Another server for multimedia session transfer in an embodiment of the present invention includes:

a first module, adapted to: receive a session transfer request sent by a User Equipment (UE), wherein the session transfer request carries a static Session Transfer Identifier (STI); determine that the UE requests to transfer an active Circuit Switched (CS) session according to the static STI; execute a procedure for transferring the active CS session according to the session transfer request and judge whether the UE has a held CS session; and if so, send a trigger signal to a second module; and the second module, adapted to: send a call request to the UE after receiving the trigger signal sent by the first module, wherein the call request carries a dynamic STI; and execute a procedure for transferring the held CS session.

Another server for multimedia session transfer in an embodiment of the present invention includes:

a first module, adapted to: receive a session transfer request sent by a UE, wherein the session transfer request carries a STI; determine that the UE requests to transfer an active CS session according to the static STI; execute a procedure for transferring the active CS session according to the session transfer request; receive another session transfer request sent by the UE, wherein the session transfer request carries the static STI and/or a STN; judge whether the UE requests to transfer a held CS session according to the static STI and/or the STN; and if so, send a trigger signal to a second module; and the second module, adapted to execute a procedure for transferring the held CS session according to the request for transferring the held CS session after receiving the trigger signal sent by the first module.

Another method for multimedia session transfer in an embodiment of the present invention includes:

sending a session transfer request that carries a static STI to a server;

receiving a response message from the server and executing a procedure for transferring a CS session that uses the static STI, and judging whether to send another CS session transfer request and execute a procedure for transferring another CS session according to the response message from the server.

Another method for multimedia session transfer in an embodiment of the present invention includes:

sending a session transfer request that carries a static STI to a server;

receiving a response message from the server, and executing a procedure for transferring a CS session that uses the static STI; and receiving a CS session call request sent by the server and executing a procedure according to the CS session call request.

Another method for multimedia session transfer in an embodiment of the present invention includes:

sending a session transfer request that carries a static STI to a server;

receiving a response message from the server, and executing a procedure for transferring a CS session that uses the static STI; and judging whether the UE has a held CS session; and if so, sending a session transfer request that carries the static STI and/or an STN.

A UE for multimedia session transfer in an embodiment of the present invention includes:

a detecting module, adapted to: detect coverage conditions of a CS network and a PS network at a current location of the UE when the UE is in a conversation, and send a trigger signal to a a transferring module when finding that the current location of the UE is covered by the PS network other than the CS network; and the transferring module, adapted to: send a CS session transfer request that carries a static Session Transfer Identifier (STI) to a server after receiving the trigger signal from the detecting module, receive a response message from the server, execute a procedure corresponding to the CS session transfer request that carries the static STI, and judge whether to send another CS session transfer request according to the response message from the server, and execute a procedure corresponding to the other CS session transfer request.

Another UE for multimedia session transfer in an embodiment of the present invention includes:

a detecting module, adapted to: detect coverage conditions of a CS network and a PS network at a current location of the UE when the UE is in a conversation, and send a trigger signal to a transferring module when finding that the current location of the UE is covered by the PS network other than the CS network; and the transferring module, adapted to: send a CS session transfer request that carries a static STI to a server after receiving the trigger signal from the detecting module, receive a response message from the server, execute a procedure corresponding to the CS session transfer request that carries the static STI, and receive a CS session call request sent by the server and execute a procedure according to the CS session call request.

Another UE for multimedia session transfer in an embodiment of the present invention includes:

a detecting module, adapted to: detect coverage conditions of a CS network and a PS network at a current location of the UE when the UE is in a conversation, and send a trigger signal to a transferring module when finding that the current location of the UE is covered by the PS network other than the CS network; and a transferring module, adapted to: send a CS session transfer request that carries a static STI to a server after receiving the trigger signal from the detecting module, receive a response message from the server, execute a procedure corresponding to the CS session transfer request that carries the static STI, and judge whether any CS session is held; and if so, send a request again for transferring the held CS session that uses the static STI and/or a STN and execute a procedure for transferring the held CS session.

The method, UE, and server for multimedia session transfer in the embodiments of the present invention fulfill the objective of transferring two multimedia sessions of a non ICS UE from a CS network to a PS network.

BRIEF DESCRIPTION OF THE DRAWINGS

To make the technical solution under the present invention clearer, the following outlines the accompanying drawings involved in the description of the embodiments of the present invention. Apparently, the accompanying drawings outlined below are exemplary only and not exhaustive, and persons of ordinary skill in the art can derive other drawings from such accompanying drawings without any creative effort.

DETAILED DESCRIPTION OF THE EMBODIMENTS

To make the technical solution, objectives and merits of the present invention clearer, the following describes nine embodiments of the present invention in more detail with reference to accompanying drawings.

Figure 1A:
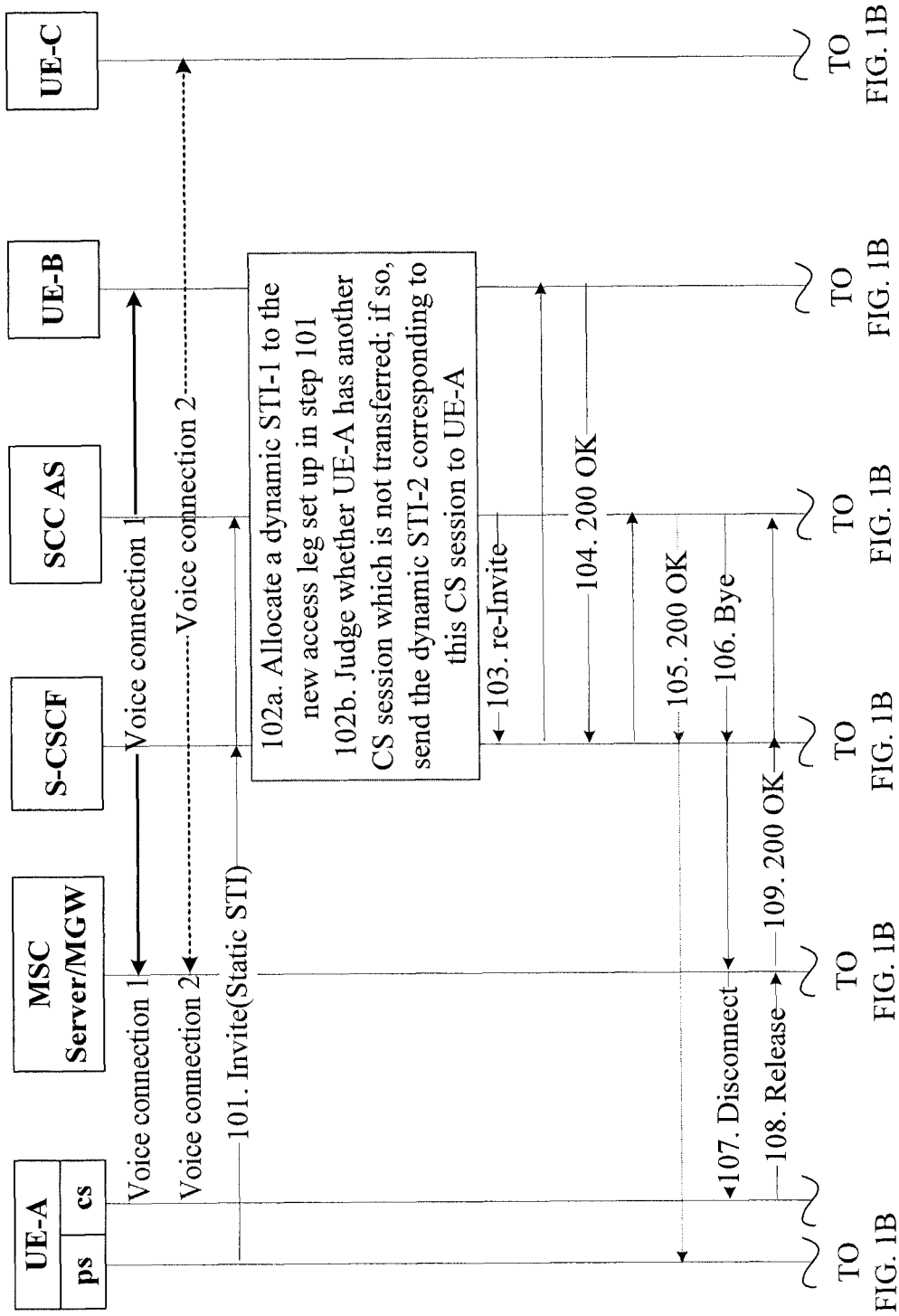
FIGS. 1A and 1B are a flowchart of a method provided in embodiment one of the present invention.
Figure 1B:
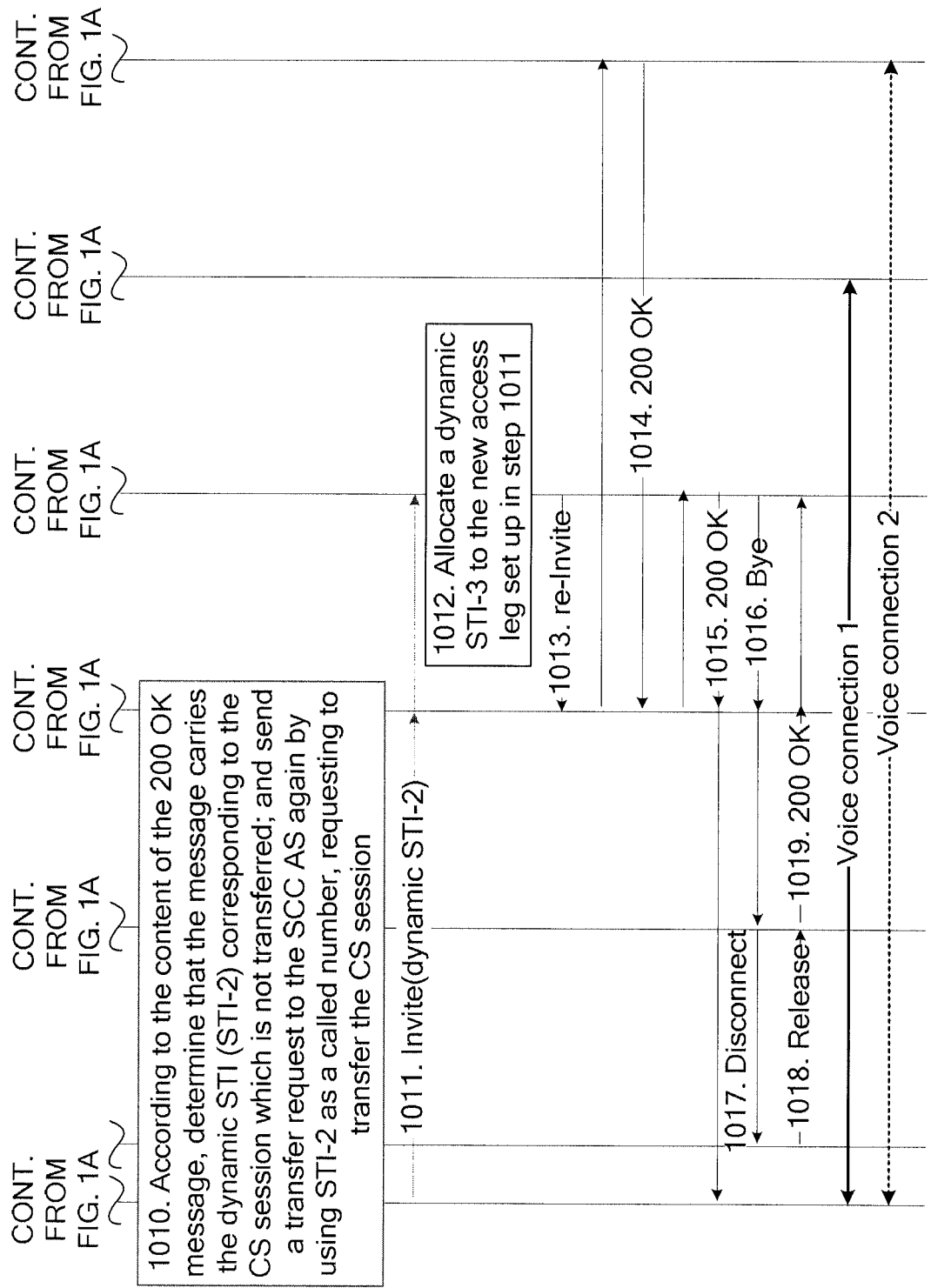

The first embodiment is a method for multimedia session transfer, which includes the following steps:

As shown in FIGS. 1A and 1B, UE-A has a CS session with UE-B and UE-C respectively, and the session between UE-A and UE-B is active, and the session between UE-A and UE-C is held. When UE-A moves to an area covered by the PS network other than the CS network, UE-A initiates a procedure for transferring the CS session from the CS network to the PS network actively. An MSC server is an entity introduced into the softswitch of the CS mobile network. It provides functions such as call control and mobility management of the MSC, and controls a CS Media Gateway (CS-MGW) to bear media streams of the call.

The MSC server communicates with the UE through layer-3 signaling of the mobile network (for example, 24.008 signaling in the 3GPP network). Meanwhile, the MSC server can implement conversion between the Session Initiation Protocol (SIP) signaling of the IMS network and the layer-3 signaling of the mobile network.

The CS-MGW is responsible for exchanging media streams between the CS network and the IMS network.

The CSCF implements the registration/registrar function, and performs session control.

The ICS UE is a UE capable of ICS. It can set up an IMS session through a Gm interface or an II interface, and can exercise session control on the CS session. The non ICS UE is a UE incapable of ICS.

Step 101: The non ICS UE-A in the PS network sends a transfer request to the SCC AS. The transfer request is a session request message that carries a static STI. The message passes through the S-CSCF and arrives at the SCC AS.

Step 102a: After receiving the request, the SCC AS determines that a new access leg is set up within the PS network, and allocates a dynamic STI (namely, STI-1) to the access leg.

Step 102b: The SCC AS judges whether UE-A has any other CS session (held CS session). If so, the SCC AS sends the dynamic STI (STI-2) corresponding to the held CS session to UE-A through a message such as a Refer message. The message carries the dynamic STI-2 corresponding to the held CS session. More specifically, the STI-2 is carried in a Refer-To header field of the Refer message. Alternatively, the dynamic STI-2 is carried in a response message in response to the transfer request that carries a static STI. For details, see step 105.

The STI-2 here may be a dynamic STI allocated by the SCC AS to a call connection at the time of setting up the call connection between UE-A and UE-C; or may be a dynamic STI allocated by the SCC AS to the held CS session temporarily according to a judgment result obtained in step 102b.

Step 103: According to the static STI carried in the transfer request in step 101, the SCC AS determines that UE-A needs to transfer out the currently active access leg of the CS network. Therefore, the SCC AS updates the peer UE-B corresponding to the CS voice connection of UE-A, with a view to requesting UE-B to transfer the session between UE-B and UE-A to the PS network of UE-A. The request passes through the S-CSCF and arrives at UE-B.

Step 104: UE-B returns a 200 OK message, which passes through the S-CSCF and arrives at the SCC AS.

Note: Step 102b may also occur after step 104.

Step 105: The SCC AS sends a 200 OK message to UE-A, confirming success of transfer. The message carries a dynamic STI-1 allocated in step 102a. Meanwhile, the dynamic STI-2 in step 102b may also be carried in the 200 OK message. In this case, both STI-1 and STI-2 can be carried in a Contact header field, a Replace header field, or a Target-Dialog header field. In this case, STI-1 and STI-2 are order-sensitive so that UE-A may determine which STI is allocated to the transfer request message, and which STI is allocated to the held CS session. Here it is assumed that STI-1 is located before STI-2.

STI-1 and STI-2 may also be carried in different header fields. In this case, STI-1 may be carried in a Contact header field, and STI-2 may be carried in a Replace header field or a Target-Dialog header field. In this way, UE-A can judge whether any STI is allocated to the held CS session according to the content of different header fields.

STI-2 may also be carried in another message such as a Refer message. The SCC AS sends a Refer message to UE-A, with STI-2 carried in a Refer-To header field of the Refer message. In this way, UE-A can determine the need of sending a transfer request that carries STI-2 to the SCC AS according to the Refer message, with a view to transferring the held CS session.

Step 106: The SCC AS sends a Bye message to the access leg of the CS network of UE-A, with a view to disconnecting the CS voice connection between UE-A and UE-B. The message passes through the S-CSCF and arrives at the MSC server of UE-A.

Step 107: After receiving the Bye message, the MSC server of UE-A sends a Disconnect message to UE-A.

Step 108: UE-A returns a Release message to the MSC server.

Step 109: After receiving the Release message, the MSC server sends a 200 OK message to the SCC AS, confirming success of disconnecting the CS voice connection. The message passes through the S-CSCF and arrives at the SCC AS.

Step 1010: If STI-2 is carried in the 200 OK message, UE-A checks whether the content of the 200 OK message includes STI-2. If finding STI-2 in the message, UE-A sends a transfer request that carries STI-2 to the SCC AS again, requesting to transfer the held CS session.

In this case, if STI-1 and STI-2 are carried in the same header field, UE-A can make the judgment according to the number of dynamic STIs. For example, in normal circumstances, the 200 OK message in step 105 carries only one dynamic STI, but the 200 OK message in step 105 carries two dynamic STIs, and therefore, UE-A determines that an STI is allocated to the held CS session, and determines that STI-1 is allocated to the new access leg of the PS network according to the order of STIs in step 105 and that STI-2 is allocated to the held CS session. If STI-1 and STI-2 are carried in different header fields, UE-A judges whether an STI is allocated to the held CS session according to whether there exists a special header field that carries STI-2.

If STI-2 is carried in a Refer-To header field of a Refer message, UE-A may send a transfer request that carries STI-2 to the SCC AS according to the Refer message, with a view to transferring the held CS session.

Step 1011: The non ICS UE-A in the PS network sends a transfer request to the SCC AS. The transfer request is a session request message that carries STI-2. The message passes through the S-CSCF and arrives at the SCC AS.

Step 1012: After receiving the request, the SCC AS determines that a new access leg is set up within the PS network according to the transfer request, and allocates a dynamic STI (namely, STI-3) to the access leg.

Step 1013: According to the dynamic STI (STI-2) carried in the transfer request in step 1011, the SCC AS determines that UE-A needs to transfer out the currently held access leg of the CS network. Therefore, the SCC AS updates the peer UE-C corresponding to the CS session of UE-A, with a view to requesting UE-C to transfer the voice session to the PS network of UE-A. The request passes through the S-CSCF and arrives at UE-C.

Step 1014: UE-C returns a 200 OK message, which passes through the S-CSCF and arrives at the SCC AS.

Step 1015: The SCC AS sends a 200 OK message to UE-A, confirming success of transfer. The message carries a dynamic STI-3 allocated in step 12.

Step 1016: The SCC AS sends a Bye message to the access leg of the CS network of UE-A, with a view to disconnecting the CS voice connection between UE-A and UE-C. The message passes through the S-CSCF and arrives at the MSC server of UE-A.

Step 1017: After receiving the Bye message, the MSC server of UE-A sends a Disconnect message to UE-A.

Step 1018: UE-A returns a Release message to the MSC server.

Step 1019: After receiving the Release message, the MSC server sends a 200 OK message to the SCC AS, confirming success of disconnecting the CS voice connection. The message passes through the S-CSCF and arrives at the SCC AS.

The merits of the solution put forward in this embodiment are: The server receives the CS multimedia session transfer request from the UE; when executing a procedure for transferring the active CS session according to the session transfer request, the server judges whether the UE has a held CS session; if so, the server sends the dynamic STI for transferring the held CS session to the UE so that the UE uses the dynamic STI to transfer the held CS session. In this way, two CS multimedia sessions of a non ICS UE can be transferred to the PS network.

Figure 2A:
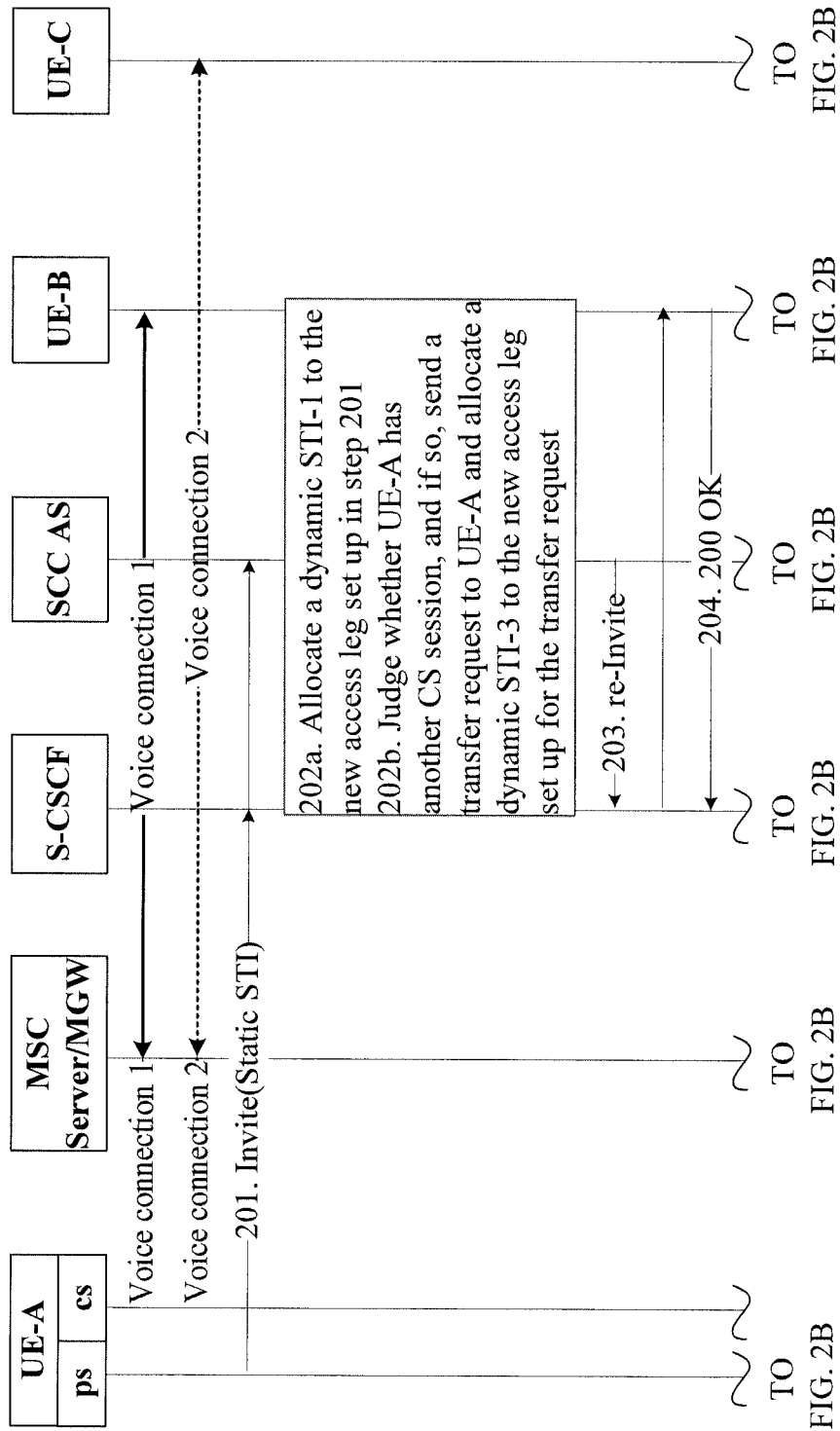
FIGS. 2A and 2B are a flowchart of a method provided in embodiment two of the present invention.
Figure 2B:
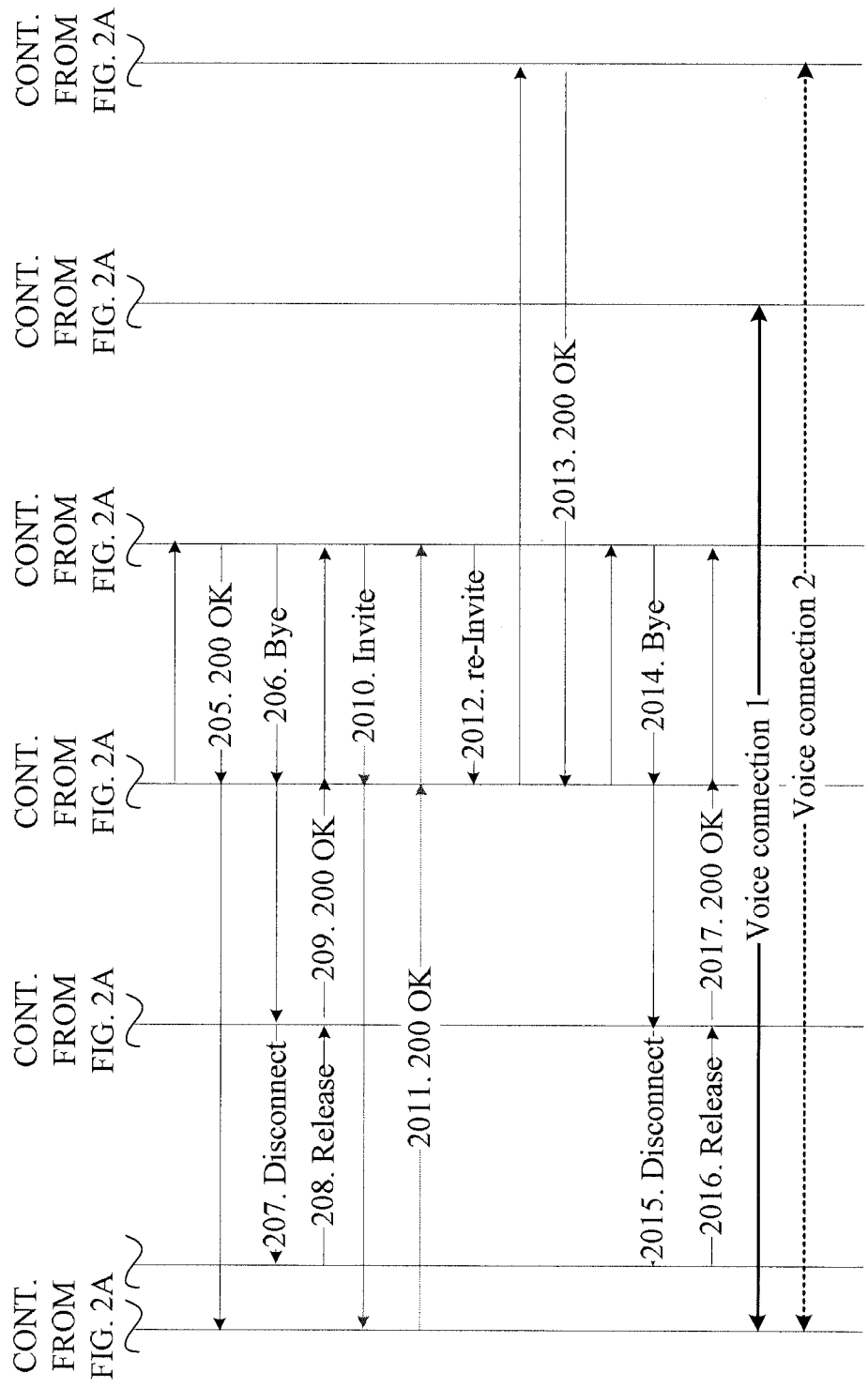

The second embodiment of the present invention is another method for multimedia session transfer, which includes the following steps:

As shown in FIGS. 2A and 2B, the prerequisites are the same as those in the first embodiment of the present invention.

Step 201: The non ICS UE-A in the PS network sends a transfer request to the SCC AS. The transfer request is a session request message that carries a static STI. The message passes through the S-CSCF and arrives at the SCC AS.

Step 202a: After receiving the request, the SCC AS determines that a new access leg is set up within the PS network, and allocates a dynamic STI (namely, STI-1) to the access leg.

Step 202b: The SCC AS judges whether UE-A has another held CS session. If so, the SCC AS sends a call request to UE-A to transfer the held CS session; and allocates a dynamic STI (namely, STI-3) to the new access leg set up for the call request.

Step 203: According to the static STI carried in the transfer request in step 201, the SCC AS determines that UE-A needs to transfer out the currently active access leg of the CS network. The SCC AS updates the peer UE-B, with a view to requesting UE-B to transfer the session between UE-B and UE-A to the PS network of UE-A. The request passes through the S-CSCF and arrives at UE-B.

Step 204: UE-B returns a 200 OK message, which passes through the S-CSCF and arrives at the SCC AS.

Step 205: The SCC AS sends a 200 OK message to UE-A, confirming success of transfer. The message carries a dynamic STI (STI-1) allocated in step 202.

Step 206: The SCC AS sends a Bye message to the access leg of the CS network of UE-A, with a view to disconnecting the CS session connection between UE-A and UE-B. The message passes through the S-CSCF and arrives at the MSC server of UE-A.

Step 207: After receiving the Bye message, the MSC server of UE-A sends a Disconnect message to UE-A.

Step 208: UE-A returns a Release message to the MSC server.

Step 209: After receiving the Release message, the MSC server sends a 200 OK message to UE-A, confirming success of disconnecting the CS voice connection. The message passes through the S-CSCF and arrives at the SCC AS.

Step 2010: The SCC AS sends a call request to UE-A. The call request carries a dynamic STI (STI-3) allocated to a new access leg which is set up for the call request.

The call request carries information indicating suppression of ringing of the UE. The information indicating suppression of ringing of the UE may be another dynamic STI (STI-2) different from STI-3, or a special indication in the Contact header field, or a special SIP header field in the call request message, or any combination thereof. STI-2 here may be an STI allocated by the SCC AS dynamically for this call transfer process, or a dynamic STI allocated by the SCC AS to a call connection between UE-A and UE-C at the time of setting up the call connection.

Step 2011: UE-A returns a 200 OK message.

According to the information indicating suppression of ringing of the UE in the received request message, the UE does not ring.

Step 2012: According to the judgment result obtained in step 202b, the SCC AS determines that UE-A needs to transfer out the currently held access leg of the CS network. Therefore, the SCC AS updates the peer UE-C corresponding to the CS session of UE-A, with a view to requesting UE-C to transfer the voice session to the PS network of UE-A. The request passes through the S-CSCF and arrives at UE-C.

Step 2013: UE-C returns a 200 OK message, which passes through the S-CSCF and arrives at the SCC AS.

Step 2014: The SCC AS sends a Bye message to the access leg of the CS network of UE-A, with a view to disconnecting the CS voice connection between UE-A and UE-C. The message passes through the S-CSCF and arrives at the MSC server of UE-A.

Step 2015: After receiving the Bye message, the MSC server of UE-A sends a Disconnect message to UE-A.

Step 2016: UE-A returns a Release message to the MSC server.

Step 2017: After receiving the Release message, the MSC server sends a 200 OK message to the SCC AS, confirming success of disconnecting the CS voice connection. The message passes through the S-CSCF and arrives at the SCC AS.

The merits of the solution put forward in this embodiment are: The server receives the CS multimedia session transfer request from the UE; when executing a procedure for transferring the active CS session according to the session transfer request, the server judges whether the UE has a held CS session; and if so, the server sends a call request that carries the dynamic STI actively to transfer the currently held CS session. In this way, two CS multimedia sessions of a non ICS UE can be transferred to the PS network.

Figure 3A:
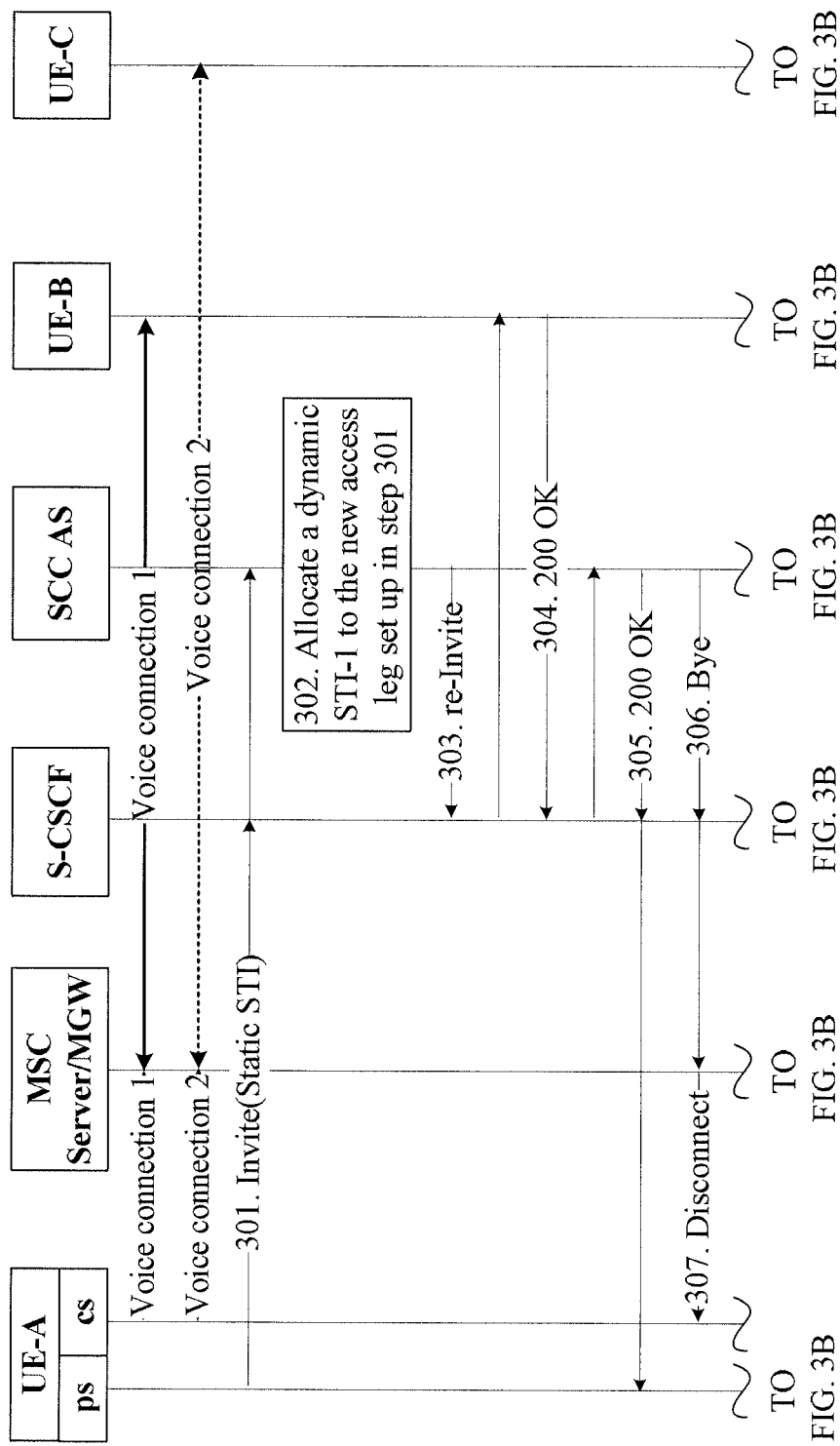
FIGS. 3A and 3B are a flowchart of a method provided in embodiment three of the present invention.
Figure 3B:
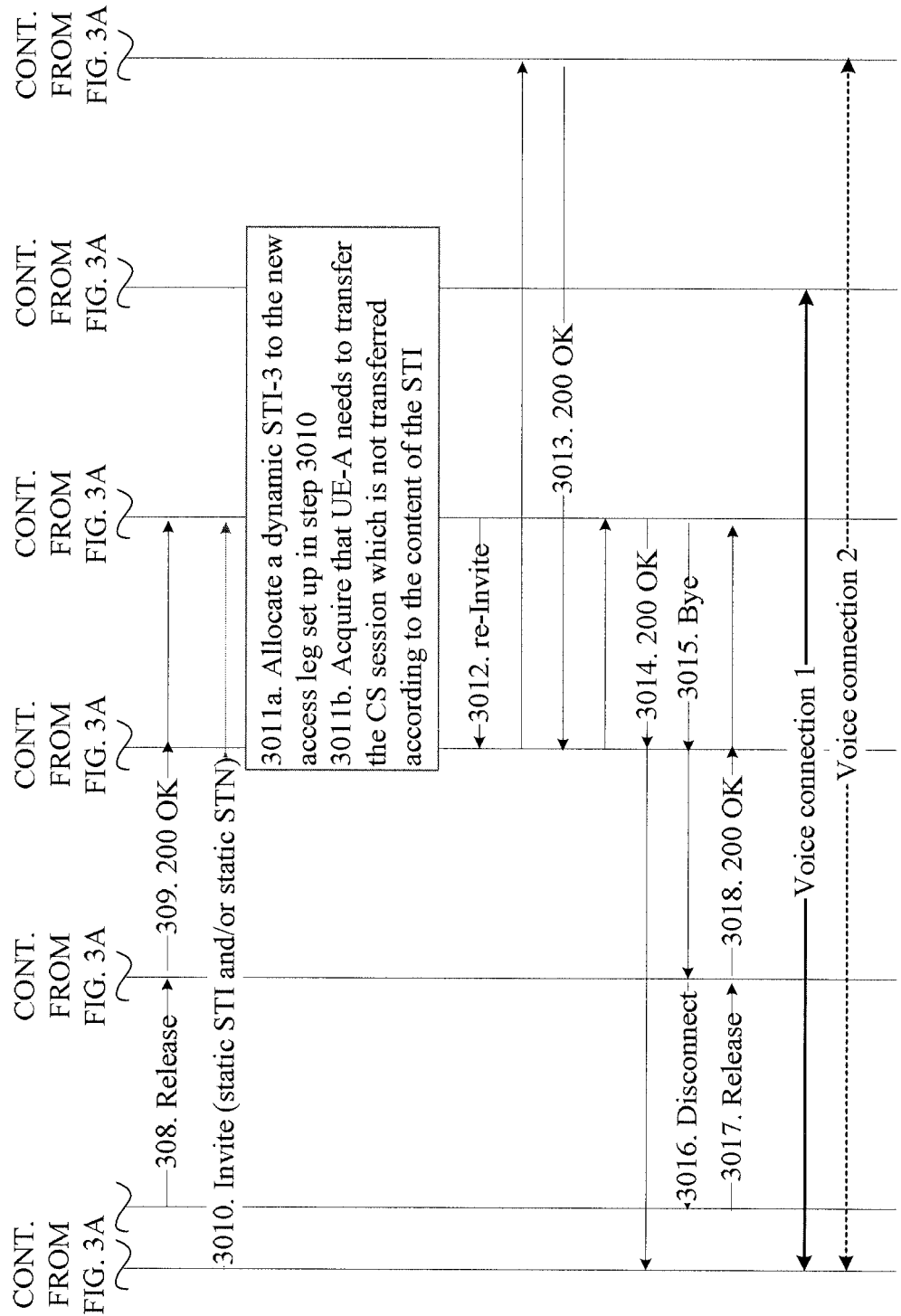

The third embodiment of the present invention is another method for multimedia session transfer, which includes the following steps:

As shown in FIGS. 3A and 3B, the prerequisites are the same as those in the first embodiment of the present invention.

Step 301: The non ICS UE-A in the PS network sends a transfer request to the SCC AS. The transfer request is a session request message that carries a static STI. The message passes through the S-CSCF and arrives at the SCC AS.

Step 302: After receiving the request, the SCC AS determines that a new access leg is set up within the PS network, and allocates a dynamic STI to the access leg. It is assumed that this STI is STI-1.

Step 303: According to the static STI carried in the transfer request in step 301, the SCC AS determines that UE-A needs to transfer out the currently active access leg of the CS network. The SCC AS updates the peer UE-B, with a view to requesting UE-B to transfer the session between UE-B and UE-A to the PS network of UE-A. The request passes through the S-CSCF and arrives at UE-B.

Step 304: UE-B returns a 200 OK message, which passes through the S-CSCF and arrives at the SCC AS.

Step 305: The SCC AS sends a 200 OK message to UE-A, confirming success of transfer. The message carries a dynamic STI (STI-1) allocated in step 2.

Step 306: The SCC AS sends a Bye message to the access leg of the CS network of UE-A, with a view to disconnecting the CS session connection between UE-A and UE-B. The message passes through the S-CSCF and arrives at the MSC server of UE-A.

Step 307: After receiving the Bye message, the MSC server of UE-A sends a Disconnect message to UE-A.

Step 308: UE-A returns a Release message to the MSC server.

Step 309: After receiving the Release message, the MSC server sends a 200 OK message to UE-A, confirming success of disconnecting the CS voice connection. The message passes through the S-CSCF and arrives at the SCC AS.

Step 3010: After determining existence of a held CS session, UE-A sends a second transfer request to the SCC AS from the PS network. The second transfer request is a session request message that carries a static STI and/or an STN. The message passes through the S-CSCF and arrives at the SCC AS.

Step 3011a: After receiving the request, the SCC AS determines that a new access leg is set up within the PS network according to the second transfer request, and allocates a dynamic STI (namely, STI-3) to the access leg.

Step 3011b: According to the content of the STI, the SCC AS determines that UE-A needs to transfer the held CS session.

If UE-A continues to initiate call transfer by using the static STI, the SCC AS determines that UE-A expects to transfer the held CS session according to order of call transfer initiated by UE-A.

If UE-A initiates call transfer by using the static STI and/or the STN, the SCC AS determines that UE-A expects to transfer the held CS session according to the content of the STI used by UE-A.

Step 3012: According to the dynamic STI (STI-3) carried in the transfer request in step 3011a, the SCC AS determines that UE-A needs to transfer out the currently held access leg of the CS network. Therefore, the SCC AS updates the peer UE-C corresponding to the CS session of UE-A, with a view to requesting UE-C to transfer the voice session to the PS network of UE-A. The request passes through the S-CSCF and arrives at UE-C.

Step 3013: UE-C returns a 200 OK message, which passes through the S-CSCF and arrives at the SCC AS.

Step 3014: The SCC AS sends a 200 OK message to UE-A, confirming success of transfer. The message carries a dynamic STI-3 allocated in step 3012.

Step 3015: The SCC AS sends a Bye message to the access leg of the CS network of UE-A, with a view to disconnecting the CS voice connection between UE-A and UE-C. The message passes through the S-CSCF and arrives at the MSC server of UE-A.

Step 3016: After receiving the Bye message, the MSC server of UE-A sends a Disconnect message to UE-A.

Step 3017: UE-A returns a Release message to the MSC server.

Step 3018: After receiving the Release message, the MSC server sends a 200 OK message to UE-A, confirming success of disconnecting the CS voice connection. The message passes through the S-CSCF and arrives at the SCC AS.

The merits of the solution put forward in this embodiment are: The server receives the CS multimedia session transfer request from the UE; when executing a procedure for transferring the active CS session according to the session transfer request, the server judges whether the UE has a held CS session; and if so, the UE sends a CS session transfer request again that carries the static STI and/or the STN. In this way, two CS multimedia sessions of a non ICS UE can be transferred to the PS network.

The fourth embodiment of the present invention is a UE for multimedia session transfer.

Figure 4:
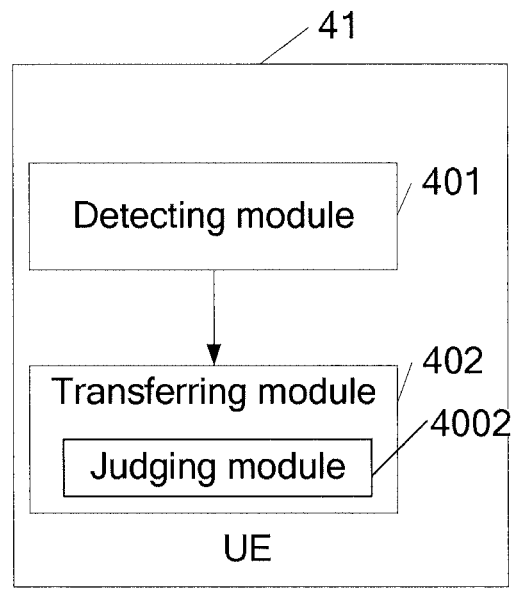
FIG. 4 shows a UE provided in embodiment four of the present invention.

As shown in FIG. 4, the UE 41 is a mobile terminal incapable of ICS, namely, a non ICS UE. The UE includes:
- a detecting module 401, adapted to: detect coverage conditions of a CS network and a PS network at a current location of the UE 41 when the UE 41 is in a conversation, and send a trigger signal to a transferring module 402 when finding that the current location of the UE 41 is covered by the PS network other than the CS network;
- the transferring module 402, adapted to: send a CS session transfer request that carries a static STI to a server after receiving the trigger signal from the detecting module 401, receive a response message from the server, execute a procedure corresponding to the CS session transfer request that carries the static STI, and judge whether to send another CS session transfer request according to the response message from the server, and execute a procedure corresponding to the other CS session transfer request; and
- a judging module 4002, located inside the transferring module 402, and adapted to: judge whether to send the CS session transfer request again according to the number of the dynamic STIs carried in the response message from the server; if two dynamic STIs exist, retrieve the dynamic STI intended for the held CS session according to the set order, and send a request again for transferring the held CS session by using the dynamic STI; or judge whether to send the CS session transfer request again according to whether the Replace header field or the Target-Dialog header field in the response message from the server carries the dynamic STI allocated to the held CS session.

The merits of the solution in this embodiment are: A design of modules of a non ICS UE is put forward so that the non ICS UE can transfer two CS multimedia sessions to the PS network.

The fifth embodiment of the present invention is a UE for multimedia session transfer.

Figure 5:
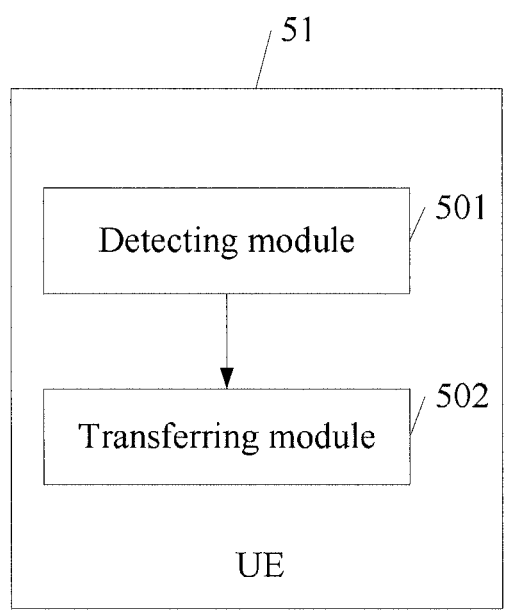
FIG. 5 shows a UE provided in embodiment five of the present invention.

As shown in FIG. 5, the UE 51 is a mobile terminal incapable of ICS, namely, a non ICS UE. The UE includes:
- a detecting module 501, adapted to: detect coverage conditions of a CS network and a PS network at a current location of the UE 51 when the UE 51 is in a conversation, and send a trigger signal to a transferring module 502 when finding that the current location of the UE 51 is covered by the PS network other than the CS network; and the transferring module 502, adapted to: send a CS session transfer request that carries a static STI to a server after receiving the trigger signal from the detecting module 501, receive a response message from the server, execute a procedure corresponding to the CS session transfer request that carries the static STI, and receive a CS session call request sent by the server and execute a procedure according to the CS session call request.

The merits of the solution in this embodiment are: Another design of modules of a non ICS UE is put forward so that the non ICS UE can transfer two CS multimedia sessions to the PS network.

The sixth embodiment of the present invention is a UE for multimedia session transfer.

Figure 6:
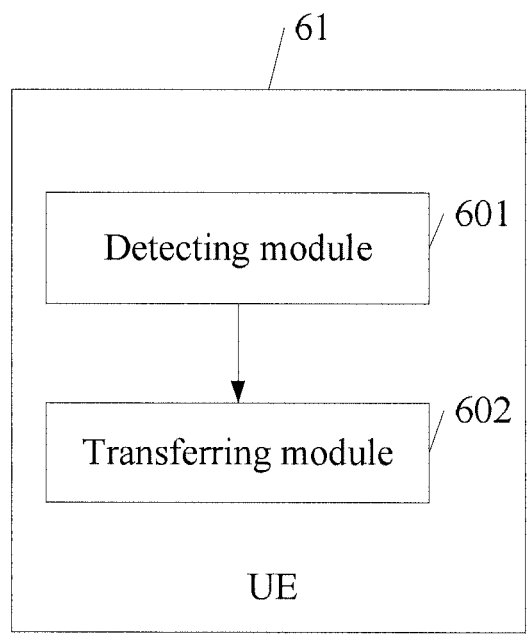
FIG. 6 shows a UE provided in embodiment six of the present invention.

As shown in FIG. 6, the UE 61 is a mobile terminal incapable of ICS, namely, a non ICS UE. The UE includes:
- a detecting module 601, adapted to: detect coverage conditions of a CS network and a PS network at a current location of the UE 61 when the UE 61 is in a conversation, and send a trigger signal to a transferring module 602 when finding that the current location of the UE 61 is covered by the PS network other than the CS network; and
- the transferring module 602, adapted to: send a CS session transfer request that carries a static STI to a server after receiving the trigger signal from the detecting module 601, receive a response message from the server, execute a procedure corresponding to the CS session transfer request that carries the static STI, and judge whether any CS session is held; and if so, send a request again for transferring the held CS session that uses the static STI and/or the STN and execute a procedure for transferring the held CS session.

The merits of the solution in this embodiment are: A third design of modules of a non ICS UE is put forward so that the non ICS UE can transfer two CS multimedia sessions to the PS network.

The seventh embodiment of the present invention is a server for multimedia session transfer.

Figure 7:
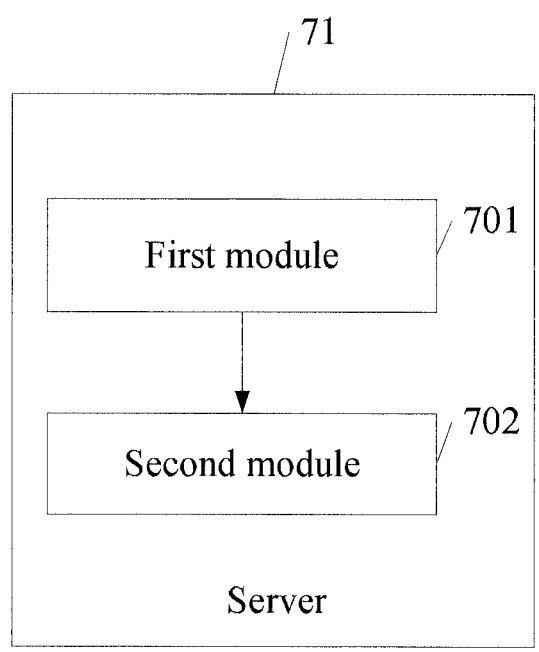
FIG. 7 shows a server provided in embodiment seven of the present invention.

As shown in FIG. 7, the server 71 is adapted to exchange information with a non ICS UE so that the UE can transfer two CS multimedia sessions to a PS network when the UE is covered by the PS network other than the CS network or scarcely covered by the CS network but well covered by the PS network. The server includes:
- a first module 701, adapted to: receive a CS session transfer request sent by the UE, where the CS session transfer request carries a static STI; determine that the UE requests to transfer an active CS session according to the static STI; process the session transfer request and judge whether the UE has a held CS session; and if so, send a trigger signal to a second module 702; and
- the second module 702, adapted to: send a dynamic STI allocated to the held CS session to the UE when receiving the trigger signal sent by the first module 701; receive another session transfer request sent by the UE, where the session transfer request carries the dynamic STI; and process the session transfer request.

The merits of the solution in this embodiment are: A design of functional modules of a server for multimedia session transfer is put forward, and therefore, two CS multimedia sessions of a non ICS UE can be transferred to the PS network when the UE is covered by the PS network other than the CS network or scarcely covered by the CS network but well covered by the PS network.

The eighth embodiment of the present invention is a server for multimedia session transfer.

Figure 8:
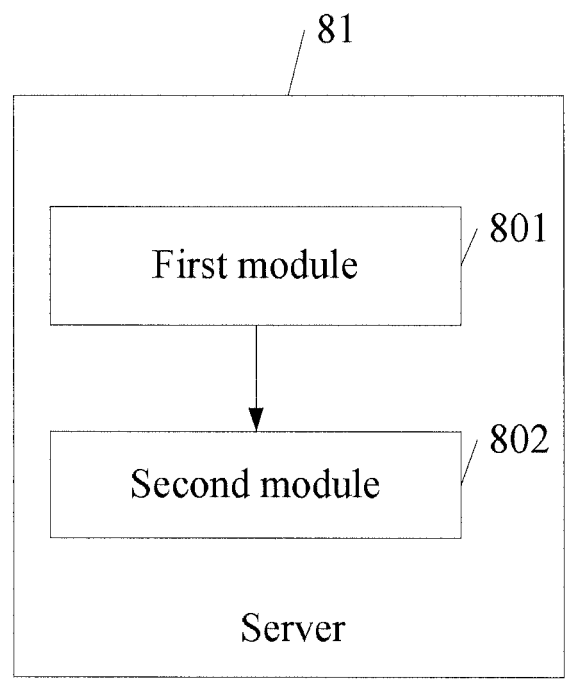
FIG. 8 shows a server provided in embodiment eight of the present invention.

As shown in FIG. 8, the server 81 is adapted to exchange information with a non ICS UE so that the UE can transfer two CS multimedia sessions to a PS network when the UE is covered by the PS network other than the CS network or scarcely covered by the CS network but well covered by the PS network. The server includes:
- a first module 801, adapted to: receive a CS session transfer request sent by the UE, where the CS session transfer request carries a static STI; determine that the UE requests to transfer an active CS session according to the static STI; execute a procedure for transferring the active CS session according to the session transfer request and judge whether the UE has a held CS session; and if so, send a trigger signal to a second module 802; and the second module 802, adapted to: send a CS session call request to the UE after receiving the trigger signal sent by the first module 801, where the CS session call request carries a dynamic STI; and execute a procedure for transferring the held CS session.

The merits of the solution in this embodiment are: Another design of functional modules of a server for multimedia session transfer is put forward, and therefore, two CS multimedia sessions of a non ICS UE can be transferred to the PS network when the UE is covered by the PS network other than the CS network or scarcely covered by the CS network but well covered by the PS network.

The ninth embodiment of the present invention is a server for multimedia session transfer.

Figure 9:
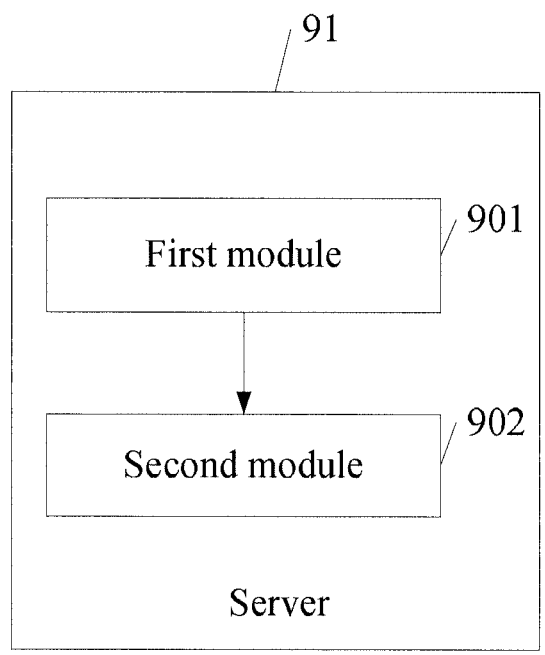
FIG. 9 shows a server provided in embodiment nine of the present invention.

As shown in FIG. 9, the server 91 is adapted to exchange information with a non ICS UE so that the UE can transfer two CS multimedia sessions to a PS network when the UE is covered by the PS network other than the CS network or scarcely covered by the CS network but well covered by the PS network. The server includes:

- a first module 901, adapted to: receive a session transfer request sent by a UE, where the session transfer request carries a static STI; determine that the UE requests to transfer an active CS session according to the static STI; execute a procedure for transferring the active CS session according to the session transfer request; receive another session transfer request sent by the UE, where the session transfer request carries the static STI and/or an STN; judge whether the UE requests to transfer a held CS session according to the static STI and/or the STN; and if so, send a trigger signal to a second module 902; and
- the second module 902, adapted to execute a procedure for transferring the active CS session according to the request for transferring the held CS session after receiving the trigger signal sent by the first module 901.

The merits of the solution in this embodiment are: A third design of functional modules of a server for multimedia session transfer is put forward, and therefore, two CS multimedia sessions of a non ICS UE can be transferred to the PS network when the UE is covered by the PS network other than the CS network or scarcely covered by the CS network but well covered by the PS network.

The above descriptions are merely preferred embodiments of the present invention, but not intended to limit the scope of the present invention. Any modifications, variations or replacements that can be easily derived by those skilled in the art shall fall within the scope of the present invention. Therefore, the scope of the present invention is subject to the appended claims.

The invention claimed is:

1. A method for multimedia session transfer by a server, comprising:
   receiving, by the server, a session transfer request sent by a User Equipment (UE), wherein the session transfer request carries a static Session Transfer Identifier (STI);
   determining, by the server, that the UE requests to transfer an active Circuit Switched (CS) session according to the static STI, executing a procedure for transferring the active CS session according to the session transfer request, and judging whether the UE has a held CS session;
   if judged by the server that the UE has a held CS session, sending a dynamic STI allocated to the held CS session to the UE; and
   receiving, by the server, another session transfer request sent by the UE,
   wherein the other session transfer request carries the dynamic STI sent by server to the UE in response to the judging by the server, and executing a procedure for transferring the held CS session according to the other session transfer request.

2. The method according to claim 1, wherein:
   the dynamic STI is allocated by a server to the held CS session at time of setting up a call connection of the held CS session, or allocated by the server to the held CS session temporarily according to a judgment result.

3. The method according to claim 2, wherein the step of sending the dynamic STI allocated to the held CS session to the UE is any one of:
   using a Contact header field, or a Replace header field, or a Target-Dialog header field of a response message in response to the CS session transfer request that carries the static STI to carry the dynamic STI, where the dynamic STI is allocated by the server to an access leg that is set up for the CS session transfer request that carries the static STI, and using such a header field to carry the dynamic STI allocated to the held CS session, wherein order of the two dynamic STIs is preset; and
   using the Contact header field of the response message in response to the CS session transfer request that carries the static STI to carry the dynamic STI, where the dynamic STI is allocated by the server to the access leg that is set up for the CS session transfer request that carries the static STI, and using the Replace header field or the Target-Dialog header field to carry the dynamic STI allocated to the held CS session; and
   sending a Refer message to the UE, and using a Refer-To header field of the Refer message to carry the dynamic STI allocated to the held CS session.

4. The method according to claim 1, wherein the step of sending the dynamic STI allocated to the held CS session to the UE is any one of:
   using a Contact header field, or a Replace header field, or a Target-Dialog header field of a response message in response to the CS session transfer request that carries the static STI to carry the dynamic STI, where the dynamic STI is allocated by a server to an access leg that is set up for the CS session transfer request that carries the static STI, and using such a header field to carry the dynamic STI allocated to the held CS session, wherein order of the two dynamic STIs is preset; and
   using the Contact header field of the response message in response to the CS session transfer request that carries the static STI to carry the dynamic STI, where the dynamic STI is allocated by the server to the access leg that is set up for the CS session transfer request that carries the static STI, and using the Replace header field or the Target-Dialog header field to carry the dynamic STI allocated to the held CS session; and
   sending a Refer message to the UE, and using a Refer-To header field of the Refer message to carry the dynamic STI allocated to the held CS session.

5. A server for multimedia session transfer, comprising:
   a first module, adapted to: receive a session transfer request sent by a User Equipment (UE), wherein the session transfer request carries a static Session Transfer Identifier (STI); determine that the UE requests to transfer an active Circuit Switched (CS) session according to the static STI; execute a procedure for transferring the active CS session according to the session transfer request and judge whether the UE has a held CS session; and if so, send a trigger signal to a second module; and the second module, adapted to: send a dynamic STI allocated to the held CS session to the UE after receiving the trigger signal sent by the first module; receive another session transfer request sent by the UE, wherein the session transfer request carries the dynamic STI; and execute a procedure for transferring the held CS session according to the other session transfer request.

6. A User Equipment (UE) for multimedia session transfer, comprising:

a detecting module, adapted to: detect coverage conditions of a Circuit Switched (CS) network and a Packet Switched (PS) network at a current location of the UE when the UE is in a conversation, and send a trigger signal to a transferring module when finding that the current location of the UE is covered by the PS network other than the CS network; and the transferring module, adapted to: send a CS session transfer request that carries a static Session Transfer Identifier (STI) to a server after receiving the trigger signal from the detecting module, receive a response message from the server including one or more dynamic STIs for other held CS sessions of the UE based upon a judging by the server the UE has the one or more held CS sessions, execute a procedure corresponding to the CS session transfer request that carries the static STI, and judge whether to send another CS session transfer request according to the response message from the server including the one or more dynamic STIs for the other held CS sessions of the UE, and execute a procedure corresponding to the other CS session transfer request.

7. The UE according to claim 6, wherein the transferring module further comprises any one of:

a judging module, adapted to: judge whether to send the CS session transfer request again according to number of dynamic STIs carried in the response message from the server; if two dynamic STIs exist, retrieve a dynamic STI intended for a held CS session according to set order, and send a request again for transferring the held CS session by using the dynamic STI; and judge whether to send the CS session transfer request again according to whether a Replace header field or a Target-Dialog header field in the response message from the server carries the dynamic STI allocated to the held CS session.

* * * * *

UNITED STATES PATENT AND TRADEMARK OFFICE
CERTIFICATE OF CORRECTION

PATENT NO. : 8,442,039 B2  
APPLICATION NO. : 12/911199  
DATED : May 14, 2013  
INVENTOR(S) : Hui Jin

Page 1 of 1

It is certified that error appears in the above-identified patent and that said Letters Patent is hereby corrected as shown below:

Title Page, Item (73) Assignee, delete "Huawei Technologies Co., Ltd.," and insert --Huawei Device Co., Ltd.,-- therefore.

Signed and Sealed this
Eighteenth Day of November, 2014

Michelle K. Lee
*Deputy Director of the United States Patent and Trademark Office*